United States Patent Office 3,447,641
Patented June 3, 1969

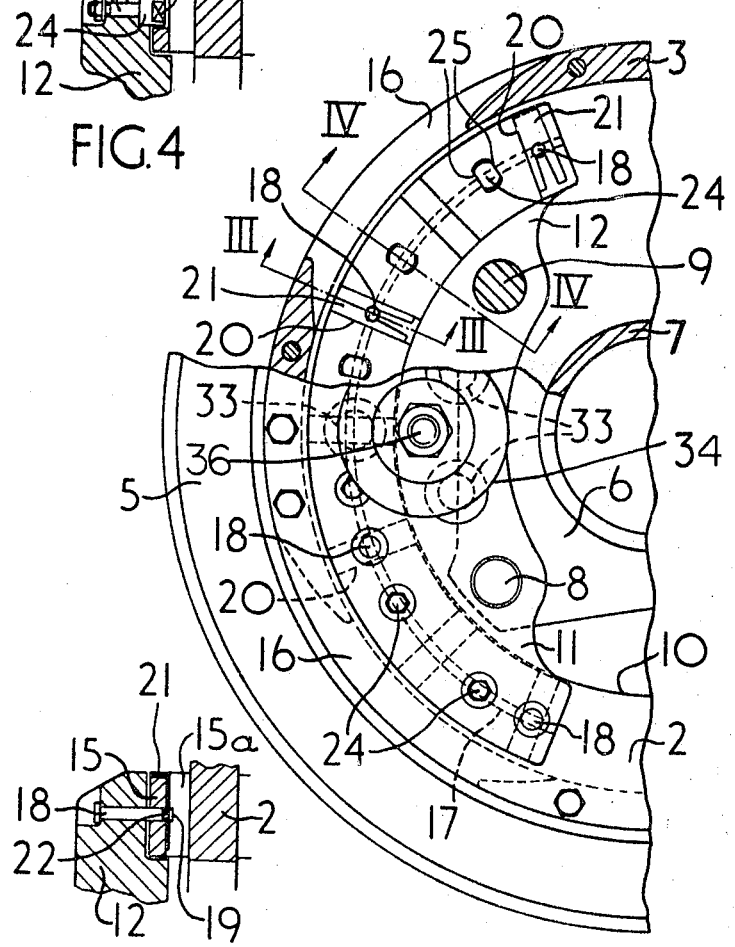

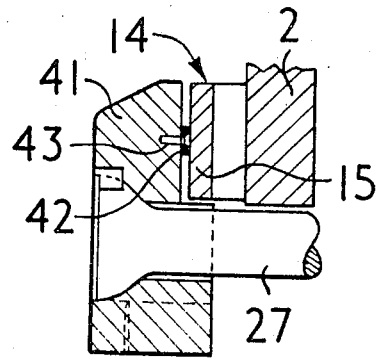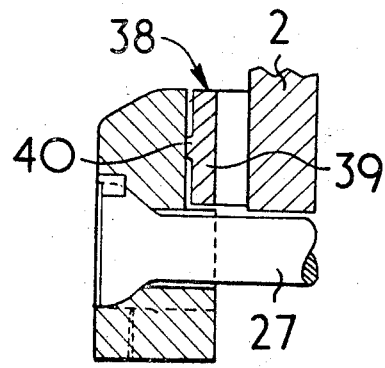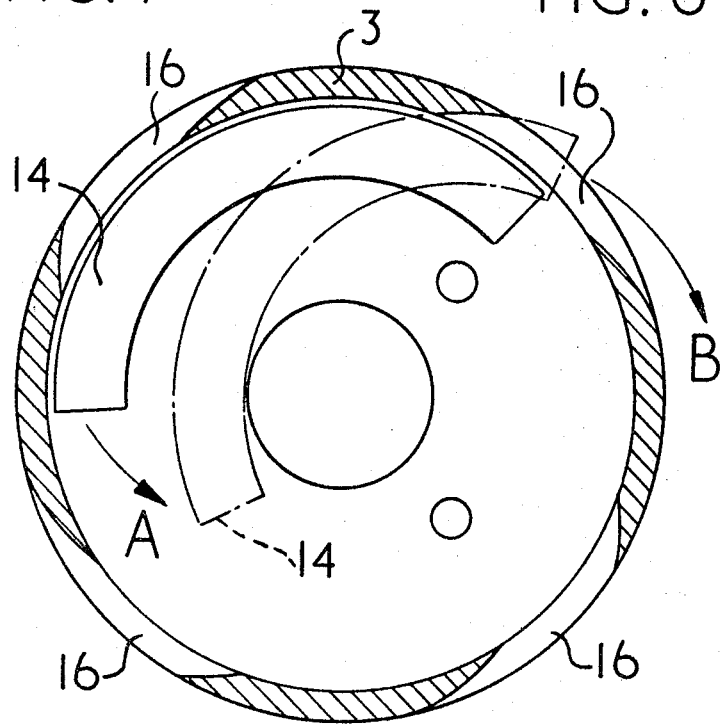

3,447,641
ARCUATE DISC BRAKE
Frederick Sidney Dowell, Coventry, England, assignor to Dunlop Rubber Company Limited, London, and Fort Dunlop Erdington, Birmingham, England, a corporation of Great Britain
Filed Apr. 21, 1966, Ser. No. 544,241
Claims priority, application Great Britain, Apr. 24, 1965, 17,386/65
Int. Cl. F16d 55/00, 65/04, 69/00
U.S. Cl. 188—73     12 Claims

ABSTRACT OF THE DISCLOSURE

This invention is a disc brake in which the friction elements are aligned in an axial direction, one on each side of a relatively rotatable disc, and are guided in their axial movements toward and away from the disc. An actuator effects frictional engagement between the friction elements and the disc and comprises a pressure plate engageable with one of the friction elements and a brake applying mechanism, which is located radially outwardly, adjacent the periphery of the rotor or disc and is adapted for moving the pressure plate and the friction elements into frictional engagement.

---

This invention relates to disc brakes, and is particularly concerned with heavy duty disc brakes of the kind in which the friction elements extend over a substantial area of the braking disc.

In a heavy duty brake of this kind the friction elements are normally axially-aligned one on each side of the disc and may each consist of a metal backing plate of arcuate form to which friction pads are attached. The means for effecting frictional engagement between the friction elements and the disc may comprise a pair of pressure plates also of arcuate form and arranged to contact the metal backing plates, a brake applying mechanism being provided for moving the pressure plates towards one another to apply axial pressure to the friction elements.

The brake-applying mechanism may comprise a central tie rod connected between the two pressure plates and passing axially adjacent a periphery of the disc, and when this arrangement is used it has been found that the pressure plates tend to be distorted and fail to apply uniform pressure to the friction elements.

One object of the invention is to provide a disc brake of the kind described above in which the pressure applied to the friction elements is more evenly distributed than in known brakes of this kind.

According to the invention a disc brake comprises a rotatable disc, a nonrotatable support, a pair of friction elements axially aligned one on each side of the disc and guided for axial movement relative to the disc, and means for effecting frictional engagement between the friction elements and the disc comprising a pressure plate engageable with one of the friction elements and a brake-applying mechanism adjacent a peripheral edge of the disc for moving the pressure plate towards the disc, the pressure plate and the friction element being formed and arranged so that the pressure plate does not engage the region of the friction element adjacent the said peripheral edge of the disc during application of the brake.

According to the invention also a disc brake comprises a rotatable annular braking disc supported at its outer peripheral edge on a spider, a pair of friction elements axially aligned one on each side of the disc and guided for axial movement relative to the disc, and means for effecting frictional engagement between the friction elements and the disc comprising a pair of pressure plates engageable one with each friction element and a tie rod passing axially adjacent the inner peripheral edge of the disc for drawing the pressure plates and their associated friction elements towards one another to engage the sides of the disc, the pressure plates and the respective friction elements being formed and arranged so that each friction element is not engaged by its respective pressure plate in the region of the friction element adjacent the inner peripheral edge of the disc during application of the brake.

Each pressure plate may be formed with an axially projecting arcuate rib for contacting the associated friction element, the rib having a radius from the axis of the disc equal to the mean radius of the annular braking surface of the disc.

The friction elements may each consist of a metal backing plate of arcuate form to which friction pads are bonded and the spider may be constructed with slots of sufficient size to enable the friction element located within the spider to be withdrawn along an eccentric arcuate path relative to the axis of the disc.

One embodiment of the invention will now be described, by way of example with reference to the accompanying drawings, in which:

FIGURE 2 is a fragmentary axial view of the brake shown in FIGURE 1, shown partly in cross-section on the line II—II of FIGURE 1;

FIGURE 3 is a fragmentary detail cross-sectional view on the line III—III of FIGURE 2;

FIGURE 4 is a fragmentary detail cross-sectional view in the line IV—IV of FIGURE 2;

FIGURE 5 is a diagrammatic cross-sectional view in the axial direction of the supporting spider of the brake shown in FIGURES 1–4, showing an arrangement for the removal and replacement of a friction element;

FIGURE 6 is an enlarged detailed view of the tie rod connection adjacent the rotor and illustrates in fragmentary enlarged view details of the rib and pad;

FIGURE 7 is an enlarged view similar to FIGURE 6 and showing a fragmentary cross-sectional view of a brake in which the separating member is in the form of a narrow arcuate strip.

Figure 1:
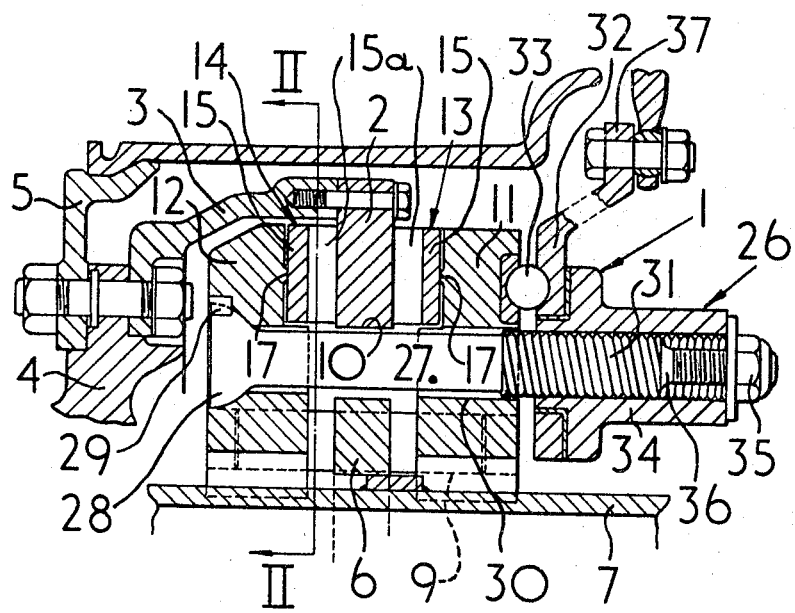
FIGURE 1 is a quarter cross-section view taken in an axial plane through a disc brake and part of an associated wheel.

A heavy duty disc brake 1 for use on a commercial motor vehicle comprises an annular disc 2 secured at its outer periphery to a spider 3 which is supported on and rotatable with the hub 4 of a road wheel 5 of the vehicle.

A support member 6 is rigidly attached to a non-rotatable portion 7 of the vehicle axle adjacent the disc, and carries a pair of parallel axially-aligned guide pins 8 and 9 extending adjacent the inner periphery 10 of the disc. A pair of arcuate pressure plates 11 and 12, positioned one on each side of the disc 2, are slidably mounted on the guide pins so as to be movable axially relative to the disc. Friction elements 13 and 14 are detachably secured to the pressure plates for engagement with the disc, each friction element comprising a metal backing plate 15 to which friction pad segments 15a are attached. Four openings in the form of slots 16 (see FIGURE 5) are formed in the outer peripheral surface of the spider 3 to permit the arcuate friction element 14 located within the spider to be removed through one of the slots in an eccentric arcuate path relative to the axis of the disc as indicated in FIGURE 5 after the friction element 14 has first been moved radially inwardly in the manner indicated in FIGURE 5.

The surface of each friction pad backing plate 15 remote from the disc is flat, and is engaged by an arcuate axially projecting rib 17 formed on the confronting surface of the associated pressure plate and extending along a circular arc having a radius from the axis of the disc 2 equal to the mean radius of the annular surface of the disc. The rib 17 ensures that the region of the friction pad backing plate lying radially inwardly from the rib 17 and adjacent the inner peripheral edge 10 of the disc is effectively relieved and is not engaged by the pressure plate.

Each friction element is secured to the associated pressure plate by means of four pins 18 (FIGURE 3) which pass through the pressure plate and have heads 19 which pass through holes in the friction pad backing plate. The friction pads are formed with radial recesses 20 to enable forked spring clips 21 to be inserted to engage reduced-diameter portions 22 of the pins 18 to hold the friction element in position. The spring clips 21 can be withdrawn radially outwardly to enable the friction elements to be removed. Six bolts 23 (see FIGURE 4) are secured to each of the pressure plates. The head 24 of each bolt 23 has parallel flats 25 formed on its sides which are aligned with the mean radius through the bolt and which co-operate with flats formed on corresponding holes in the associated backing plate, to provide circumferentially-spaced torque-taking abutments to resist the circumferential drag on the friction elements during braking. Clearance is provided at the inner and outer cylindrical parts of the bolt head, so that while the pad backing plate is positively located on the parallel flats, angular distortion of radial sections of the pressure plate under load can take place without affecting the associated pad backing plate.

A brake-applying mechanism 26 mounted on the non-rotatable support member 6 comprises a tie-rod 27 having a head 28 which is nonrotatably secured by a peg 29 to the inner pressure plate 12, within the spider 3, the rod 27 extending axially adjacent the inner periphery 10 of the disc and passing slidably through a hole 30 formed in the outer pressure plate, the outer end 31 of the rod being screw-threaded.

An annular thrust plate 32 (FIGURE 2) is located co-axially with the tie rod 27 and forms, together with the adjacent outer pressure plate 11 (FIGURE 1), a ball and ramp operating mechanism, three ball bearings 33 being located in ramped recesses between the pressure plate 11 and the thrust plate 32 to provide an axial thrust on relative angular movement between the thrust plate and the pressure plate. A spacing sleeve 34 is in screw-threaded engagement with the end 31 of the rod 27 and is locked in position on the tie rod by a nut 35 in screw-threaded engagement with a reduced-diameter screw-threaded portion 36 of the tie rod 27. An operating lever 37 is formed integrally with the thrust plate to enable the thrust plate to be rotated to generate an axial thrust which forces the adjacent pressure plate 11 towards the disc. The resulting reaction sets up a tension in the tie rod which draws the two pressure plates 11 and 12 towards one another to grip the disc 2 between them.

Play resulting from friction pad wear is taken up by loosening the nut 35, screwing the sleeve 34 along the tie rod effectively to shorten its length, and retightening the nut 35. When the pads are fully worn the remanent of the pads can be removed bodily by detaching the spring clips 21 described above. Withdrawal of the friction element 14 mounted within the spider is effected by moving one end towards the axis of the disc as indicated by arrow A in FIGURE 5, and then threading the other end out in a spiral path through one of the slots 16 in the spider 3, as indicated by arrow B in FIGURE 5.

In the disc brake described above, only the narrow arcuate rib on each of the pressure plates makes contact with the backing plate of the associated friction element. During braking, under the action of the load from the tie rod and the reaction from the backing plate on the arcuate rib, the plane of the pressure plate is distorted to a shallow, approximately, conical form, the radially inner regions (FIGURE 1) being displaced relatively closer to the disc than the outer regions. The arcuate rib remains in a substantially flat plane, being a rolling axis for the structure at any radial cross-section, and consequently applies a substantially uniform pressure loading along the line of contact with the pad backing plate. The distribution of pressure may be made more uniform by suitably designing the pressure plate with a varying radial cross-sectional thickness, tapering from the middle towards each end.

The pad backing plate is of sufficient thickness to ensure negligible bending of the radially inner and outer portions of the plate about the line of the arcuate rib. Uniform pad wear is ensured by the rigidity of the backing plate and by the location of the arcuate rib substantially at a radius which provides a uniform value over the pad surface for the work rate function, that is, the surface pressure multiplied by the surface rubbing speed, the general relationship being that the radially inner portions of the pad surface be applied at a higher pressure and conversely the surface pressure at the radially outer portions of the pad are lower because of the greater rubbing speed. In the case of an annular segmental-shaped friction pad, the said radius is equal to the mean radius of the pad.

With this construction the pressure plate is permitted to distort under load without such distortion affecting the proper loading of the friction pads, guidance to the pad assembly from the pressure plate being maintained by the curved line of contact between the backing plate and the arcuate rib.

If the pressure plates were initially flat and with rigidly attached friction pads, as in previously known brakes of this kind, the distortion to conical form would cause excessive surface pressure near the radially inner edges of the plates, and inadequate or zero pressure near the outer edges, the pressure variation increasing with braking force. This uneven and variable pressure distribution would produce local high temperatures in the disc and reduce the brake efficiency since not all of the available friction material is being utilized during a braking stop. Furthermore, since service is required upon achieving metal-to-metal contact, the friction pad must be replaced while there is still available friction lining at the radially outer portion, which must be wastefully discarded. It would lead to non-uniform and variable patterns of pad wear, resulting in changes in brake efficiency during the life of the brake.

In an alternative construction, the pressure plates may each be formed from an arcuate plate having a flat surface for contacting the backing plate, the radially inner region of the pressure plate being relieved so that it does not contact the backing plate. When the pressure plate is distorted to a dished or conical shape under brake operating pressure the radially outer region no longer contacts the backing plate, and the pressure is applied along a narrow circumferential band as in the embodiment described above.

In further alterantive constructions, the arcuate rib or the radially inner relieved region may be formed on the contact face of the pad backing plate, and the contact face of the pressure plate made flat or formed with a matching arcuate rib or relief. The pressure plate and backing plate may be formed with flat adjoining faces, and a separating member in the form of a narrow arcuate strip or annular sheet of material may be interposed between the adjoining faces to leave the necessary relieved inner region. These alternative constructions are shown in detail view in FIGURES 6 and 7, the illustration of FIGURE 6 being in accordance with the embodiment illustrated in FIGURES 1 through 5, this fragmentary detail cross-sectional view illustrated in FIGURE 6 indicates the friction elements 38 in which backing plates 39 are each formed within axially projecting arcuate rib 40 coaxial with the disc 2 for engagement with a flat contact face of the associated pressure plate. The radius of the arcuate rib is equal to the mean radius of the annular braking surface of the disc 2.

In FIGURE 7, there is shown a fragmentary detail cross-sectional view of part of a brake constructed and arranged in a manner otherwise similar to that shown in FIGURE 1; pressure plates 41 may be provided, each having a flat contact face opposite its respective backing plate 15. A separating member in the form of a narrow arcuate strip 42 is located between each pressure plate and its respective backing plate and secured by screws 43 to the pressure plate so as to leave the necessary relieved inner region.

For easier installation the pad assembly may be split into two or more separate sectors, but a one-piece pressure plate is preferred, since it provides better support for the friction pads than a multi-piece construction. Although the invention has been illustrated and described in conjunction with certain selected example embodiments, it will be understood that these are illustrative of the invention and are by no means restrictive thereof. It is reasonably to be expected that those skilled in this art can make numerous revisions and adaptations and it is intended that such revisions and adaptations will be included within the disclosed invention as equivalents of the invention.

Having now described my invention, what I claim is:

1. In a disc brake, including a rotatable annular braking disc providing braking surfaces at each of the opposite surfaces thereof, the structure comprising a pair of friction elements axially disposed one on each side of said disc and guided for axial movement relatively to the disc into frictional engagement therewith, actuating means for effecting frictional engagement between said friction elements and their respectively confronting friction surfaces of said disc, said means comprising a pair of pressure plates engageable, one with each friction element, and a tie rod passing axially adjacent the inner periphery of said disc for biasing said friction elements into engagement with said disc, each of said pressure plates associated, one with each of said friction elements having a relatively narrow thrust surface engageable with a confronting surface of one of the friction elements and disposed at a radial location effecting a substantially uniform work rate function over the surface of its associated friction element, said pressure plate and friction element being engageable with one another for the transmission of brake applying thrust therebetween along an arcuate edge which is coaxial with the disc and having a radius in the region of the mean radius of the inner and outer peripheral edges of the friction element, the arcuate edge defining the radially outer edge of a relieved region extending between the confronting faces of the friction element and the pressure plate over the whole area of the friction element which lies radially within said arcuate edge, said pressure plates and friction elements being spaced from one another in the region adjacent the inner periphery of said disc, and circumferentially-spaced torque taking abutments in combination with said pressure plate and engaging the friction elements to resist the circumferential drag exerted on the friction elements by the disc during braking.

2. A disc brake according to claim 1 wherein each friction element comprises a metal backing plate which is formed with an axially projecting arcuate rib for engagement with the associated pressure plate.

3. A disc brake according to claim 1 wherein a separating member is interposed between the adjoining faces of each pressure plate and the associated friction element to prevent contact between said faces in the region adjacent the inner peripheral edge of the disc.

4. A disc brake according to claim 1 wherein the spider is formed with at least one opening through which the friction element located within the spider can be removed along an eccentric arcuate path relative to the axis of the disc.

5. A disc brake according to claim 1 wherein a friction element is detachably secured to its associated pressure plate by means of axially extending pins secured to the pressure plate and passing through holes in the friction element, the pins having reduced-diameter portions and forked spring clips being provided to engage said reduced-diameter portions to prevent the friction element from being removed from the pressure plate.

6. A disc brake according to claim 5 wherein circumferentially-spaced torque-taking abutments are provided on the pressure plate to engage corresponding holes in the friction element to resist the circumferential drag thereon during braking, the abutments each having a pair of parallel flats aligned with the mean radius through the abutment for co-operation with corresponding flats formed on the corresponding hole in the friction element, the arrangement being such that while the friction element is positively located on the parallel flats angular distortion of radial sections of the pressure plate under load can take place without affecting the associated friction element.

7. A disc brake according to claim 1 wherein the face of each pressure plate engaging the friction element is relieved in the region adjacent the inner peripheral edge of the disc.

8. A disc brake according to claim 7 wherein the face of each pressure plate engaging the friction element is received in the region lying radially within a circular arc drawn about the axis of the disc and having a radius equal to the mean radius of the annular braking surface of the disc.

9. A disc brake according to claim 1 wherein each pressure plate is formed with an axially projecting arcuate rib for engagement with the associated friction element.

10. A disc brake according to claim 9 wherein the arcuate rib has a radius from the axis of the disc equal to the mean radius of the annular braking surface of the disc.

11. A disc brake according to claim 1 wherein each friction element comprises a metal backing plate which is relieved on the face engaging the pressure plate in the region adjacent the inner periphery of the disc.

12. A disc brake according to claim 11 wherein each backing plate is relieved on the face engaging the pressure plate in the region lying radially within a circular arc drawn about the axis of the disc and having a radius equal to the mean radius of the annular braking surface of the disc.

References Cited

UNITED STATES PATENTS

| | | | |
|---|---|---|---|
| 1,867,348 | 7/1932 | Blume | 188—234 |
| 2,451,326 | 10/1948 | Eksergian et al. | 188—234 |
| 2,804,176 | 8/1957 | Trevaskis | 188—73 |
| 2,953,221 | 9/1960 | Lucien | 188—73 |
| 3,186,517 | 6/1965 | Harrison | 188—73 |
| 3,189,129 | 6/1965 | Burnett | 188—73 |
| 3,292,740 | 12/1966 | Swift | 188—73 |
| 3,190,398 | 6/1965 | Evans. | |

FOREIGN PATENTS 614,125   2/1961   Canada.

GEORGE E. A. HALVOSA, Primary Examiner.

U.S. Cl. X.R.
188—234, 250